Dec. 29, 1964 E. HOPNER ETAL 3,163,821

PHASE SHIFT BINARY DATA TRANSMISSION SYSTEM INCLUDING CARRIER TRANSMISSION ACCORDING TO THE DATA

Filed June 16, 1961 8 Sheets-Sheet 1

INVENTORS
EMIL HOPNER
CONSTANTIN M. MELAS
BY Joseph B Taphorn
ATTORNEY

Dec. 29, 1964 E. HOPNER ET AL 3,163,821

PHASE SHIFT BINARY DATA TRANSMISSION SYSTEM INCLUDING CARRIER TRANSMISSION ACCORDING TO THE DATA

Filed June 16, 1961 8 Sheets-Sheet 6

Dec. 29, 1964 E. HOPNER ETAL 3,163,821
PHASE SHIFT BINARY DATA TRANSMISSION SYSTEM INCLUDING
CARRIER TRANSMISSION ACCORDING TO THE DATA
Filed June 16, 1961 8 Sheets-Sheet 8

United States Patent Office 3,163,821
Patented Dec. 29, 1964

3,163,821

PHASE SHIFT BINARY DATA TRANSMISSION SYSTEM INCLUDING CARRIER TRANSMISSION ACCORDING TO THE DATA

Emil Hopner, San Jose, and Constantin Michael Melas, Saratoga, Calif., assignors to International Business Machines Corporation, New York, N.Y., a corporation of New York Filed June 16, 1961, Ser. No. 117,673
10 Claims. (Cl. 325—38)

This invention relates in general to systems for transmitting binary data signals between remote points, and in particular to a data transmission system in which the binary intelligence is transmitted in the form of phase reversal of a carrier signal.

An object of the present invention is to provide an increased speed binary data transmission system.

Another object of the present invention is to provide a data transmission system in which the carrier frequency need not equal the bit rate.

A further object of the present invention is to provide a binary data transmission system which may be asynchronously operated.

A still further object of the present invention is to provide a binary data transmission system which is capable of sending at 2400 or more binary bits per second through a conventional telephone line having a band pass spectrum from 600 to 3000 cycles per second.

A still further object of the present invention is to provide a data transmission system in which "jitter" distortion is reduced.

Other objects and advantages of the improved system will become apparent from the following description when read in connection with the drawings in which.

Figures 1, 3:
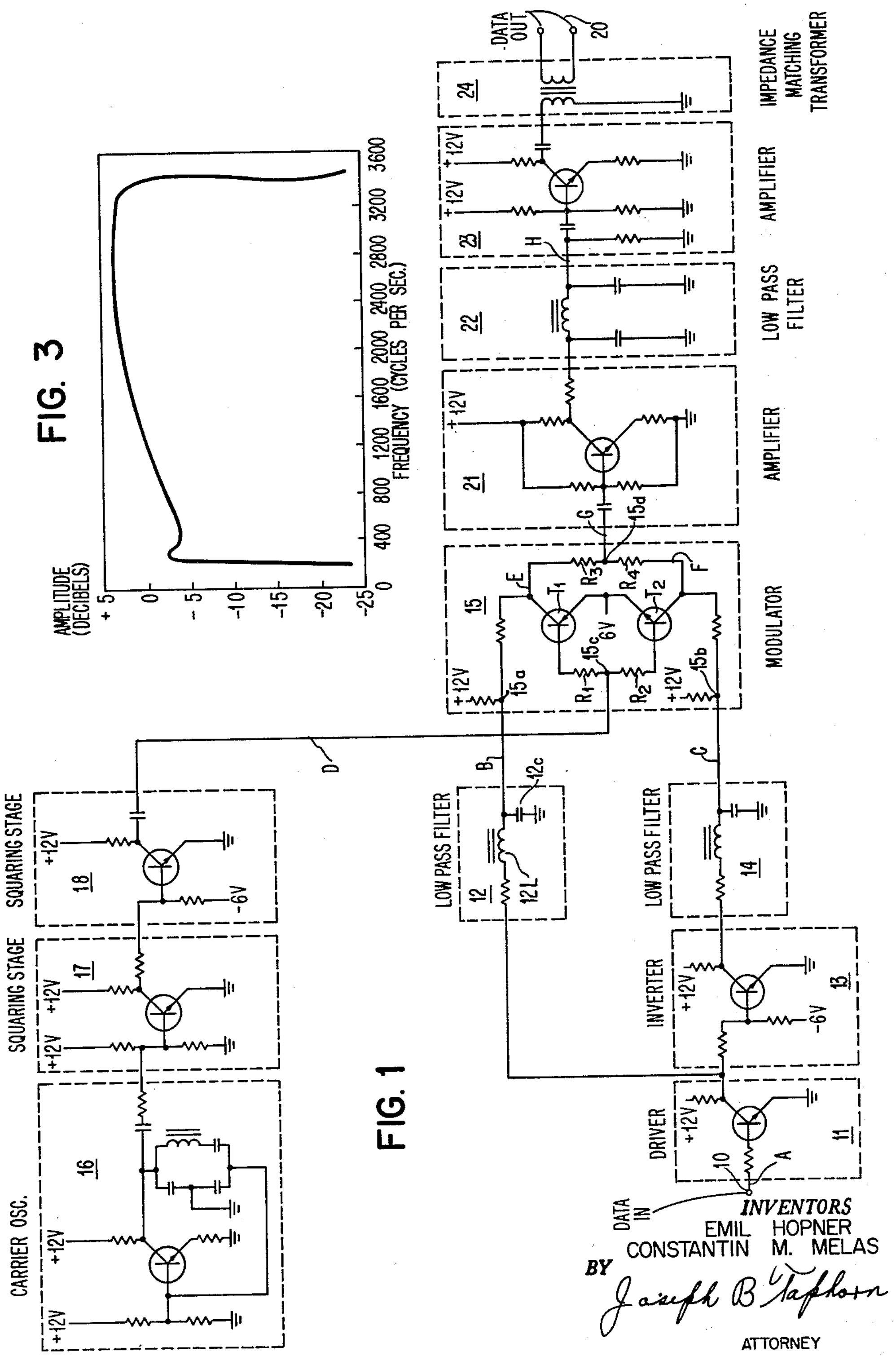
FIG. 1 is a schematic diagram of the transmitter.
FIG. 3 illustrates the frequency response of the telephone line which interconnects the transmitter shown in FIG. 1 with the receiver shown in FIG. 2.

Referring first to FIG. 1, the transmitter has an input terminal 10 which is connected to a data source (not shown) which supplies binary data signals for transmission to the receiver through the communication channel at the rate of 2400 bauds per second. The binary data signal supplied by the data source is shown in FIG. 4A as comprising a conventional nonreturn to zero (NRZ) 1010 data pattern for the purpose of explanation only. Other known data representation schemes may be employed with the present arrangement with the same satisfactory operation. For example, the signal shown in FIG. 4A may represent a 1111 data pattern in another well known data representation scheme. It will, of course, be realized that this NRZ data pattern will vary depending on the intelligence being conveyed and that any random data pattern including a series of all binary 1's or all binary 0's may be supplied. Two other NRZ data patterns are shown in line A of FIGS. 5 and 6. The bit rate, or more precisely, the number of bauds transmitted per second for each of the illustrated data patterns remains constant at 2400, while the frequency over any finite time interval may be considered to vary from 1200 c.p.s. for the NRZ 1010 data pattern to zero for an NRZ data pattern of all 1's or all 0's.

The transmitter shown in FIG. 1 comprises generally a signal driver 11, a low pass filter 12, an inverter 13, a second low pass filter 14, a linear product modulator 15, and a carrier source which comprises a carrier oscillator 16 and a pair of squaring amplifiers 17 and 18. The output of modulator 15 is supplied to the telephone line 20 through an amplifier 21, a low pass filter 22, a second amplifier 23 and an impedance matching transformer 24.

The binary data signal from the data source is supplied to the signal driver 11 which comprises a conventional transistor driver arranged in a grounded emitter configuration. The collector output of signal driver 11 is resistively coupled to low pass filter 12, comprising inductance 12L and capacitance 12C. Inductance 12L and capacitance 12C have values to provide a cut-off frequency of 1500 c.p.s. for the filter. The output signal of the low pass filter 12 is supplied to input terminal 15*a* of the modulator 15. This signal is shown in FIG. 4B and represents a sinusoid having a frequency of 1200 c.p.s.

The collector output of the signal driver 11 is also resistively coupled to inverter 13 which reinverts the data signal to its original form as represented by FIG. 4A. The collector output of inverter 13 is supplied to low pass filter 14, which is identical to low pass filter 12. The output signal of low pass filter 14 is supplied to terminal 15*b* of modulator 15 and corresponds to the wave form shown in FIG. 4C. The function of the low pass filters 12 and 14 is to filter substantially all frequencies above 1500 cycles from the squared data signal.

The source of carrier signals is connected to input terminal 15*c* of the linear product modulator 15. The source of carrier signals comprises a conventional transistor oscillator 16 arranged to oscillate at 1800 c.p.s. The output of the oscillator is supplied to a pair of cascade connected squaring amplifiers 17 and 18 to provide a squared carrier signal to input terminal 15*c*. The signal supplied by the carrier source is shown in FIG. 4D and has a frequency of 1800 c.p.s., which is chosen in this particular embodiment to correspond to substantially the center frequency of the frequency spectrum of the telephone line which is shown in FIG. 3. Since the carrier oscillator 16 is independent of the data source, the transmitter operates asynchronously.

The linear product modulator 15 functions to multiply the filtered data signal by the carrier signal to provide an upper and lower side band signal. With a carrier signal of 1800 c.p.s. and a data signal having a 1010 pattern, the upper side band frequency is at 3000 cycles, and the lower side band signal is at 600 cycles, with both the carrier signal of 1800 cycles and the data signal at 1200 cycles being suppressed. However, with any data pattern other than a 1010 pattern, the signals supplied by the low pass filters contain a D.C. component which allows the carrier signal to be present in the output signal of the modulator. The amplitude of the carrier signal for any particular data pattern will be proportional to the D.C. component present in the outputs from the filters 12 and 14. The transmitter may therefore be considered to supply a double side band signal having a carrier component proportional to the D.C. level present in the filtered data signal supplied to the modulator terminals 15*a* and 15*b*.

Modulator 15 comprises a pair of symmetrical transistors T1 and T2, which are arranged in a complementary fashion. The base of each transistor is connected to the input terminal 15*c* of modulator 15 through resistors R1 and R2. The collector of transistor T1 is connected to input terminal 15*a*, while the collector of transistor T2 is connected to input terminal 15*b*. The emitters of each transistor are connected to a common bias source which in this instance is 6 volts. The collector of each transistor is connected to output terminal 15*d* by means of a pair of summing resistors R3 and R4.

Transistors T1 and T2 function effectively as a pair of oppositely arranged switches. In effect when the squared carrier signal is at an "up" level, transistor T1 is cut off allowing the inverted data signal to be supplied to output terminal 15*d*. However, during the time that transistor T1 is cut off, transistor T2 is conducting, which, in effect, connects input terminal 15*b* to ground through the 6 volt bias source. Thus the noninverted data signal supplied to input terminal 15*b* is prevented from reaching output terminal 15*d*. When the carrier signal is at a "down" level, a similar operation occurs, but the roles of transistors T1 and T2 are now reversed. With the carrier signal at a down level transistor T1 is conducting and transistor T2 is cut off so that the inverted data signal is shorted to ground and the reinverted data signal is supplied to output terminal 15*d*. The signals at the collectors of transistors T1 and T2 are represented in FIGS. 4E and 4F, while the summed signal is shown in FIG. 4G.

The output of modulator 15 is amplified by amplifier 21 and supplied to low pass filter 22, which has a cut-off frequency of 3500 cycles. The output signal of the filter 22 is shown in FIG. 4H, and as shown comprises a composite signal made up of a 600 cycle sine wave and a 3000 cycle sine wave. The function of the filter 22 may be more readily explained by reference to FIG. 4I, which represents in the frequency domain the signal shown in FIG. 4G in the time domain. Filter 22 functions to eliminate cross-modulation products above 3500 c.p.s. produced by the modulator 15 as a result of the higher frequencies contained in the squared carrier signal shown in FIG. 4D.

The filtered output signal 4H from the filter 22 is amplified by amplifier 23 and supplied to the telephone line through the impedance matching transformer 24, and in accordance with the standard communication practice may be subjected to additional modulation and demodulation operations. However, it should be understood that substantially the same signal wave form is supplied to the receiver except for slight distortions caused by the telephone channel and some phase displacement of the wave relative to its phase as transmitted if the telephone line is asynchronous.

Figure 4:
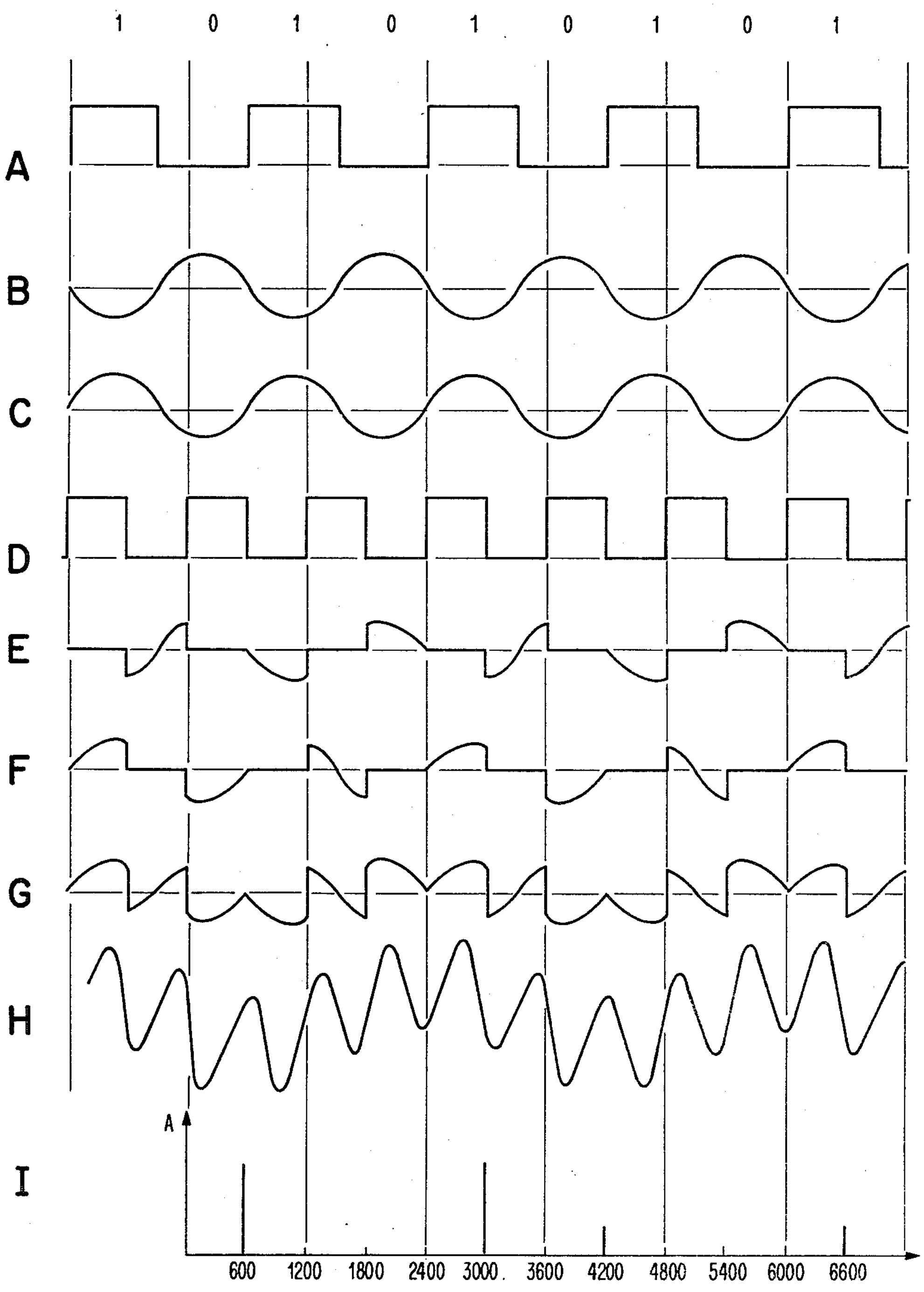
FIG. 4 illustrates various wave forms which appear in the transmitter of FIG. 1 for a repetitive 1010 data pattern.
Figure 5:
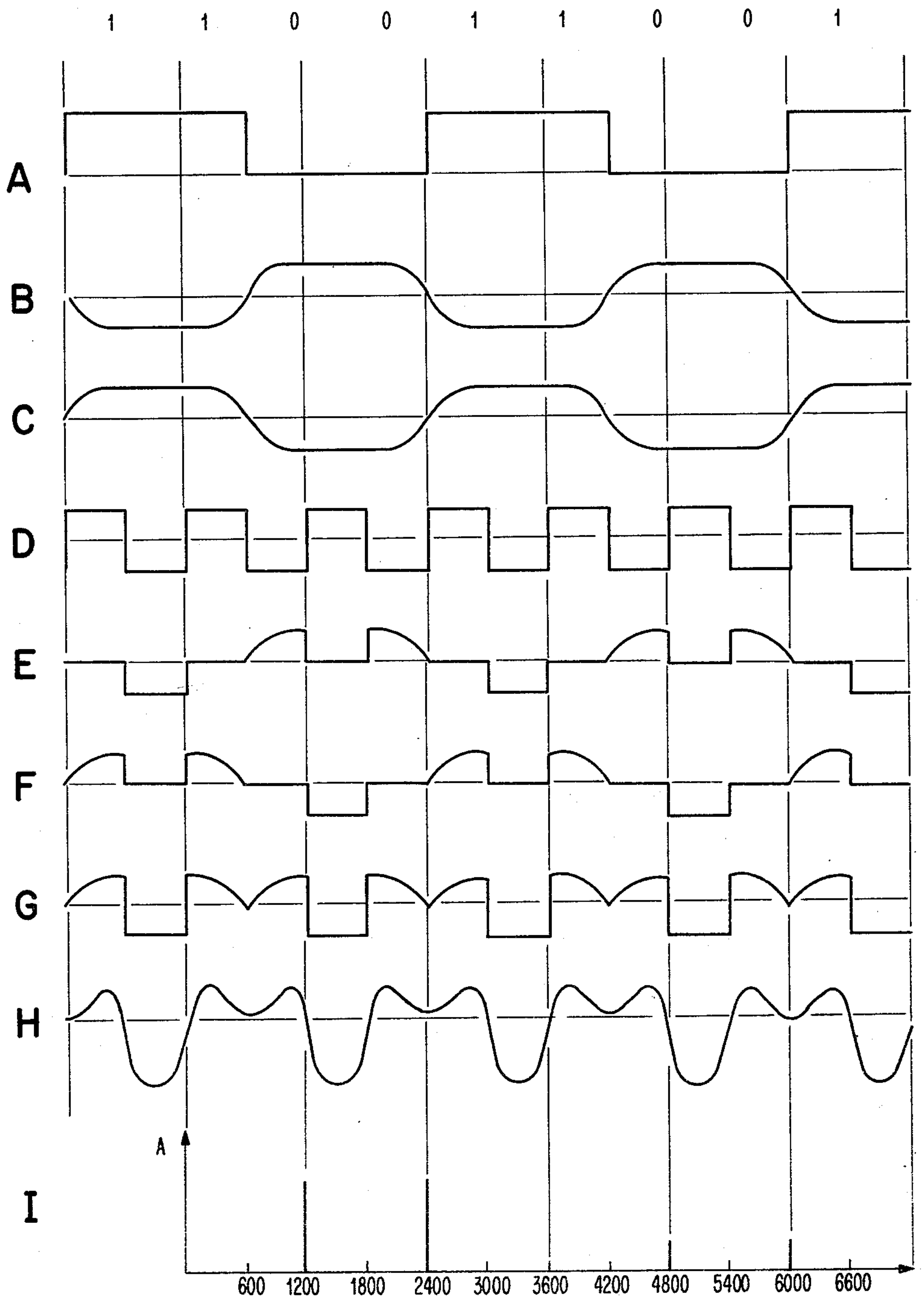
FIG. 5 illustrates corresponding wave forms for a 110011 data pattern.
Figure 6:
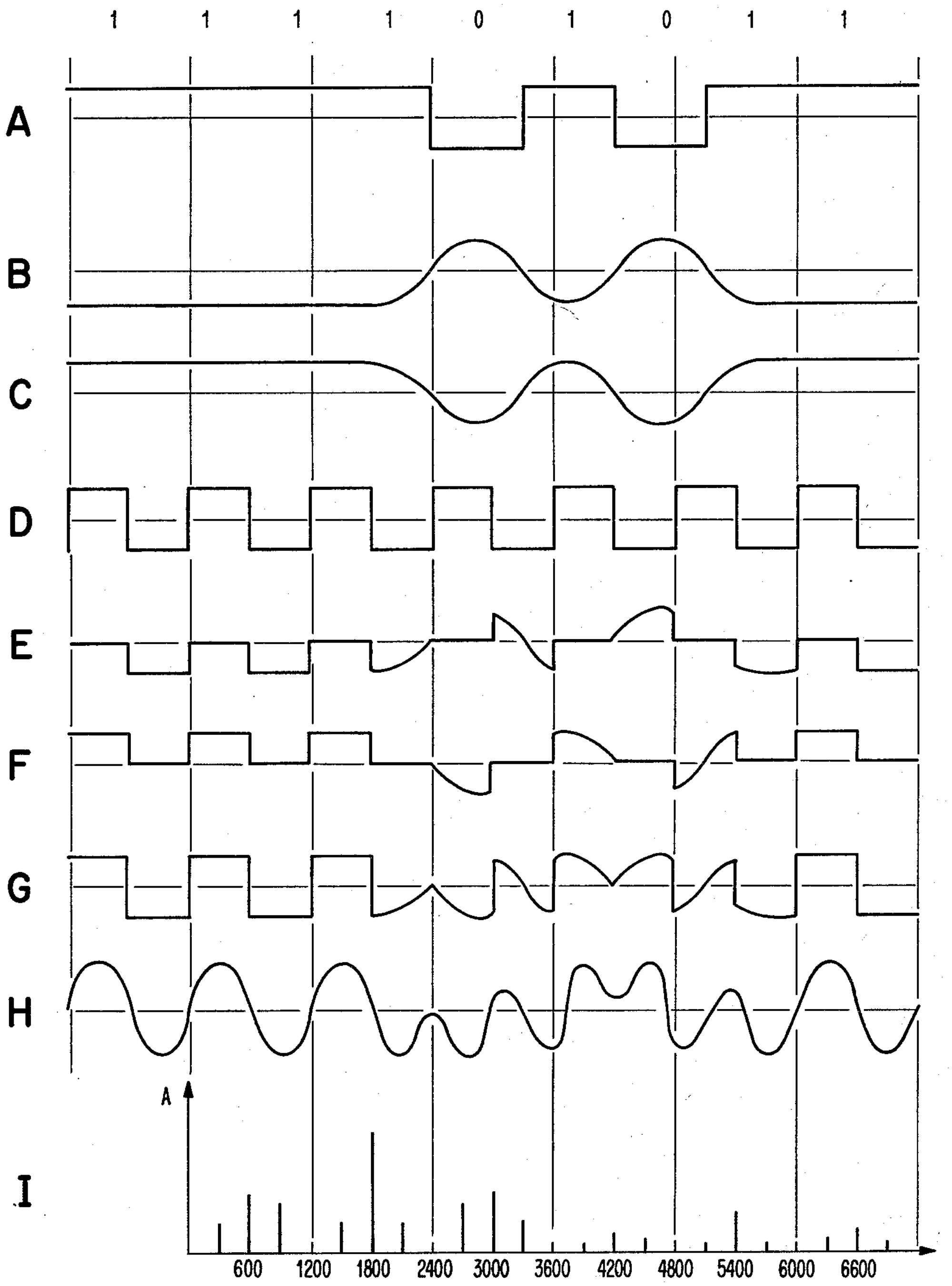
FIG. 6 illustrates corresponding wave forms for a 1110101 data pattern.
Figure 7:
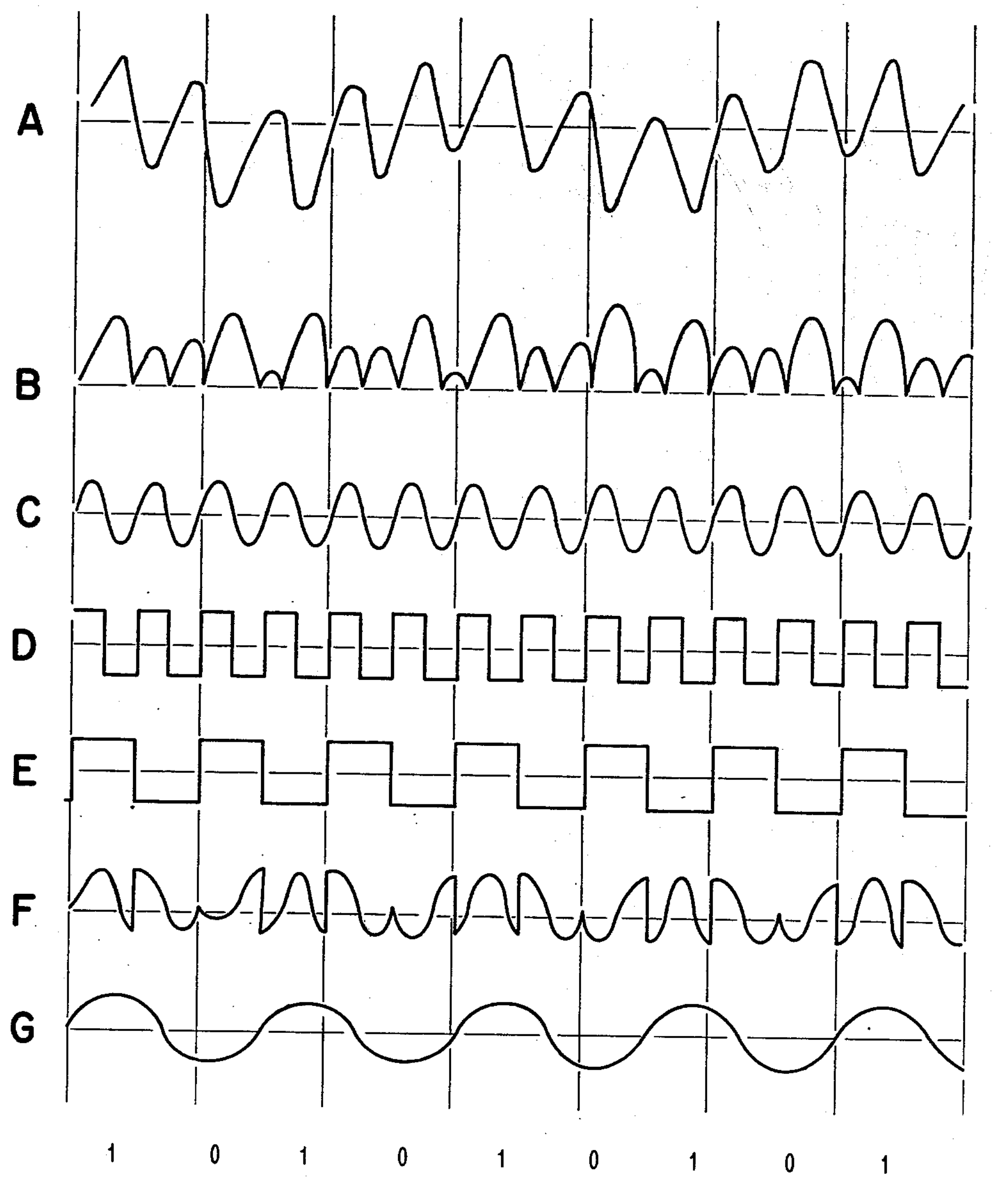
FIG. 7 shows wave forms of signals having a 1010 data pattern which appear at various points in the receiver and are indicated on FIG. 2.
Figure 8:
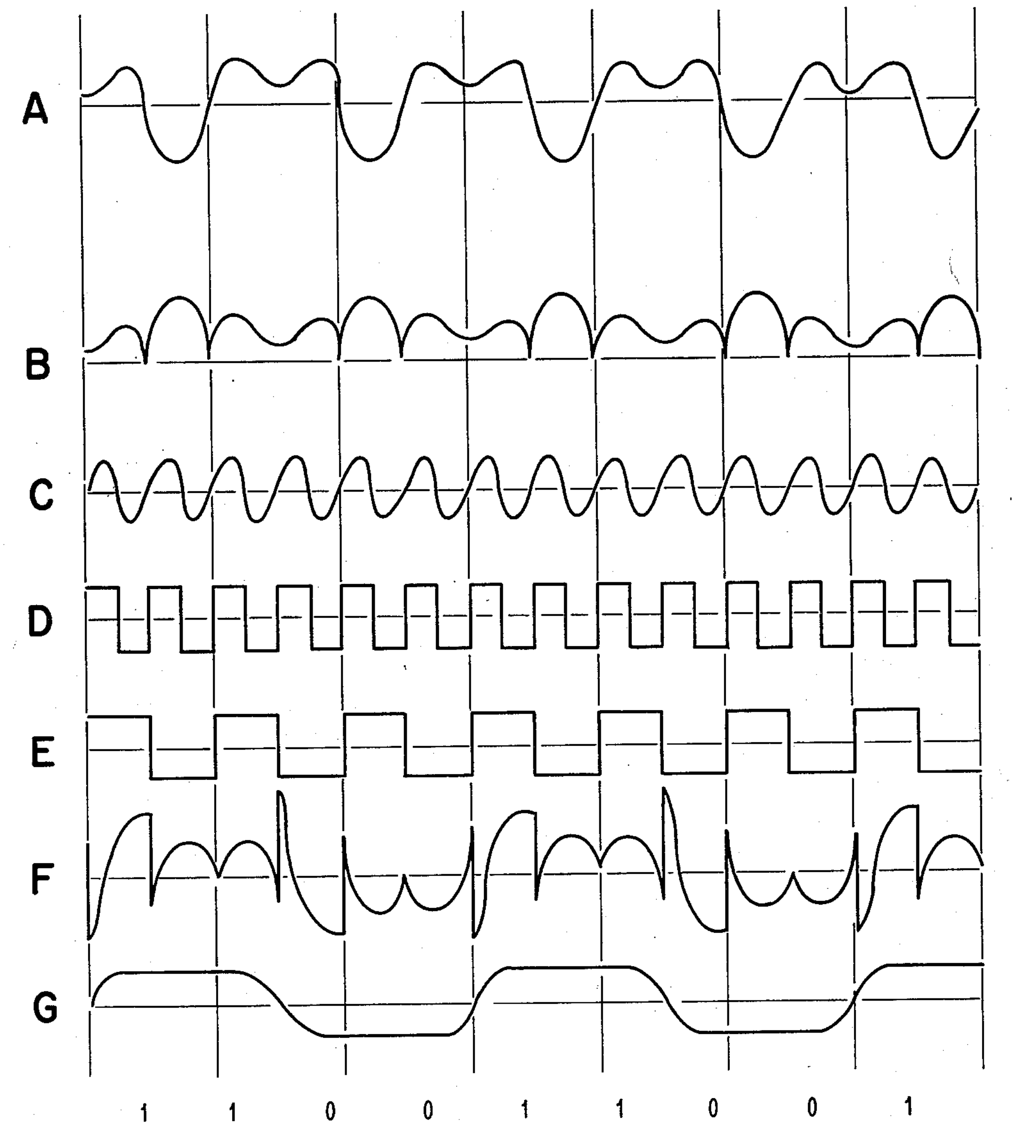
FIG. 8 shows wave forms corresponding to FIG. 7 for a 110011 data pattern.
Figure 9:
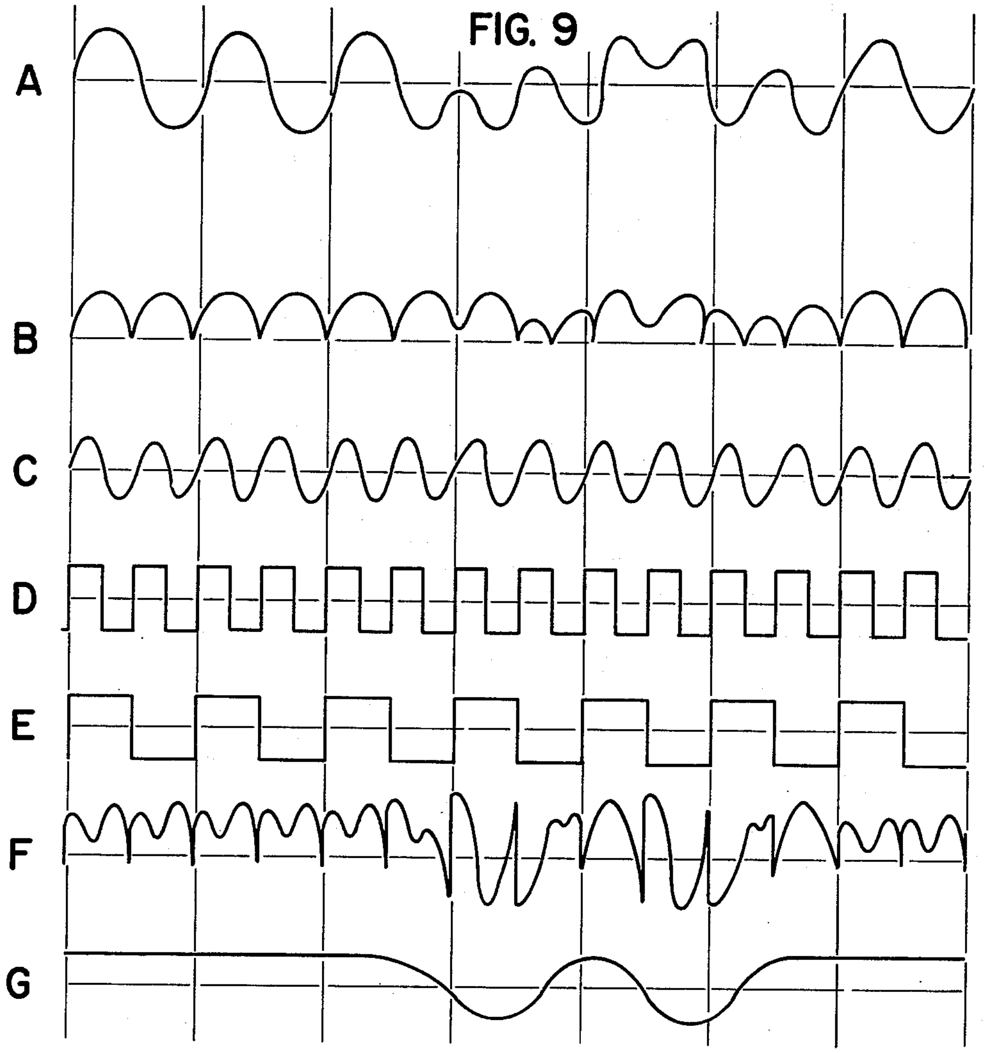
FIG. 9 shows wave forms corresponding to FIG. 7 for a 11110101 data pattern.

FIGS. 5 and 6 illustrate wave forms corresponding to those in FIG. 4, but for two other data patterns.

Figure 2:
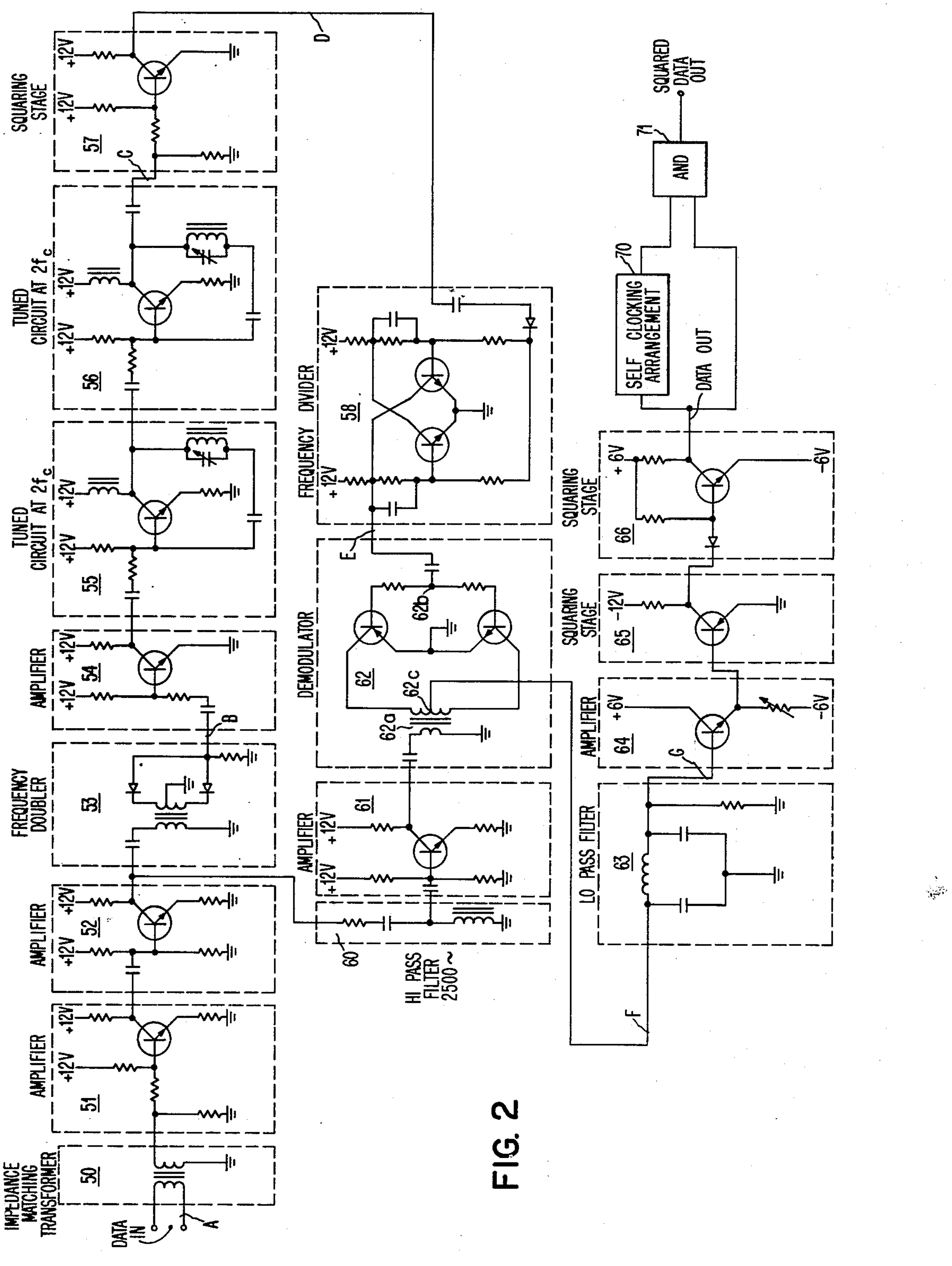
FIG. 2 is a schematic diagram of the receiver.

Referring to FIG. 2, the receiver comprises generally means for providing a carrier signal at the receiver, means for synchronously demodulating the received signal with the regenerated carrier to provide an output information signal, and means for sampling the output information signal to recover the binary intelligence.

As shown an impedance matching transformer 50 and two stages of amplification 51 and 52 are provided for supplying the transmitted signal to the carrier generating means and the synchronous demodulating means.

The output of the amplifier 52 is supplied to the carrier regenerating and the signal detecting means in parallel. The carrier regenerating means includes a frequency doubler 53 consisting of a full wave rectifier, an amplifier 54, and a pair of cascade connected tuned circuits 55 and 56 which provide a sinusoidal signal at twice the carrier frequency in response to the output signal of the frequency doubler 53. The output of the tuned circuit 56 is connected to a squaring amplifier 57, whose output is connected to a frequency divider 58, which functions to provide a demodulating signal to the synchronous demodulator of the detecting means. The frequency of the output signal of the frequency divider 58 is substantially identical to the frequency of the carrier signal 4D of the transmitter. It also has substantially the same phase relationship relative to the signal supplied to the receiver as carrier signal 4D of the transmitter has with the input signal 4A.

The details of the carrier regenerator will not be described since they form no part of the present invention.

The detecting means as shown includes a high pass filter 60, an amplifier 61, a synchronous demodulator 62, a low pass filter 63, a linear amplifier 64 and a pair of cascade connected squaring amplifiers 65 and 66. The output of the squaring amplifier 66 represents the recovered data signal and is sampled at the correct intervals to recover the data by means of a self-clocking arrangement 70.

The function of high pass filter 60 is to eliminate all frequencies below 2500 c.p.s. Thus in the particular embodiment the lower side band signal is eliminated, any carrier component is eliminated, any spurious noise signals having frequency components below 2500 c.p.s. are eliminated or reduced. The purpose of eliminating the lower side band is that conventional telephone lines distort one side band signal more than the other. As a result the signal supplied to the transformer input 62*a* of synchronous demodulator 62 is subject to less jitter distortion, and therefore may be more reliably detected. If the particular system is operating with a transmission channel where both side bands have identical channel characteristics, the high pass filter 60 could be replaced by a band pass filter allowing a signal containing a band of frequencies from 600 to 3000 cycles to be supplied to the transformer input 62*a* of the demodulator 62.

The output signal of the high pass filter 60 is amplified by amplifier 61 and supplied to the demodulator 62. The demodulator 62 is a conventional transistorized synchronous demodulator or detector and is similar to that employed in the transmitter, except for the transformer input. The signal supplied to the transformer input 62*a* is in effect alternately switched to the output terminal 62*c* depending on its phase relative to the regenerated carrier supplied to the terminal 62*b*. The output of the demodulator 62 is supplied to the low pass filter 63 which has a cut-off frequency of 1200 c.p.s. Low pass filter 63 functions to eliminate cross-modulation products above 1200 c.p.s. generated by demodulator 62, as a result of harmonics contained in the regenerated carrier. The output signal from low pass filter 63 is supplied to the sampling gate 71 through three stages of amplication 64, 65 and 66. The output of squaring amplifier 66 represents the recovered data signal and is sampled at appropriate times by the self-clocking arrangement represented diagrammatically by block 70. Any suitable clocking arrangement may be employed. For example, the self-clocking arrangement shown in copending application Serial No. 824,380, filed July 1, 1959, and assigned to the assignee of the present invention, may be employed to perform the function represented by block 70.

FIGS. 7A–7G represent wave forms of signals having a 1010 data pattern, which appear at various points in the receiver and are indicated on FIG. 2.

FIGS. 8A–8G represent wave forms corresponding to FIGS. 7A–7G for a 110011 data pattern. FIGS. 9A–9G represent wave forms corresponding to FIGS. 7A–7G for a 11110101 data pattern.

Figure 10:
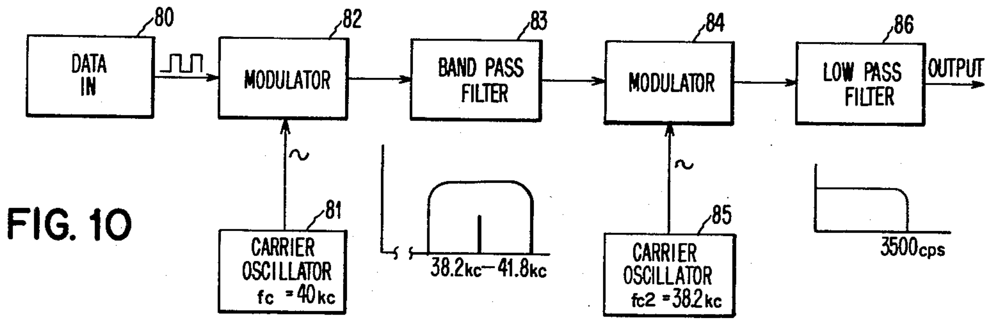
FIG. 10 is a block diagram of a modification of the transmitter shown in FIG. 1.

A modification of the transmitter shown in FIG. 1 is illustrated in block diagram in FIG. 10. As shown in FIG. 10 the transmitter comprises a data source 80, a carrier oscillator 81, a first modulator 82, a band pass filter 83, a second modulator 84, a second carrier oscillator 85 and a low pass filter 86. The data signal corresponds to that shown in FIG. 4A. Modulator 82 may be a conventional ring modulator which provides a double side band suppressed carrier type signal. Carrier oscillator 81 provides a 40 kc. signal to modulator 82. With a 1010 data pattern the fundamental of the data input signal provides a lower and upper side band frequency of 38.8 kc. and 41.2 kc., respectively. Other harmonics of the data signal provide side bands which are higher and lower, but these unwanted cross-modulation products are eliminated by the band pass filter 83.

The double side band suppressed carrier signal supplied from filter 83 is again modulated by a second ring modulator 84, which is supplied with a carrier signal from carrier oscillator 85 having a frequency of 38.2 kc.

Modulator 84 functions to shift the double side band signal from filter 83 to a position in the frequency spectrum which allows the signal to be transmitted through a conventional telephone channel, whose spectrum may be represented by FIG. 3. In this instance modulator 84 shifts the entire spectrum of the double side band signal to a frequency range where the center frequency of the spectrum is located at 1800 c.p.s. Low pass filter 86 functions to filter the upper side band signal produced by modulator 84. The idealized wave forms provided by low pass filter 86 therefore correspond substantially to the output signal shown in FIG. 4H, for the transmitter shown in FIG. 1.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a transmitter responsive to a source of a binary signal, signal generating means, comprising:
   - a square wave carrier signal generator;
   - means to provide from the source the binary signal and its complement;
   - first and second filtering means responsive to the binary signal and its complement, respectively, to provide separate signals representing the fundamental components thereof;
   - a modulator connected to said filtering means and to said carrier signal source and having a pair of output lines, one carrying a signal during a first portion of the carrier signal and the other carrying a signal during a second portion of the carrier signal;
   - a summer connected to the output lines of said modulator; and
   - a filter to pass only selected low frequency components of the output signal of said summer.

2. The transmitter of claim 1 in which said square wave carrier signal generator operates asynchronously with regard to the pulse repetition rate characterizing the binary signal.

3. The combination of claim 1 and a communications link connected to said filter and a receiver connected to said communications link.

4. The combination of claim 3 in which said receiver includes means to regenerate the square wave carrier signal.

5. The combination of claim 4 in which said receiver includes a filter capable of discriminating in favor of one sideband frequency of the signal.

6. The combination of claim 5 in which the filter of said receiver affects the signal prior to demodulation.

7. The combination of claim 6 in which said receiver includes a filter capable of discriminating against cross modulation product frequencies generated by demodulation.

8. The combination of claim 7 in which said receiver includes means to sample the output signal from the cross modulation filter.

9. In a transmitter responsive to a source of a nonreturn to zero binary signal, signal generating means, comprising:
   - a square wave carrier signal generator;
   - means to provide from the source the binary signal and its complement;
   - filtering means responsive to the binary signal and its complement to provide separate signals representing the fundamental components thereof;
   - a modulator connected to said filtering means and to said carrier signal source and having an output signal characterized by a D.C. component proportional to the frequency of transitions in the binary signal; and
   - a filter to pass only selected low frequency components of the output signal of said modulator.

10. In a transmitter responsive to a source of a nonreturn to zero binary signal, signal generating means, comprising:
    - a square wave carrier signal generator;
    - means to provide from the source the binary signal and its complement;
    - filtering means responsive to the binary signal and its complement to provide separate signals representing the fundamental components thereof;
    - a modulator connected to said filtering means and to said carrier signal source and having an output signal consisting of the carrier signal during periods of no variation in value of the binary signal and otherwise consisting of an alternating signal with a D.C. component; and
    - a filter to pass only selected low frequency components of the output signal of said modulator.

References Cited in the file of this patent

UNITED STATES PATENTS

| | | |
|---|---|---|
| 2,680,151 | Boothroyd | June 1, 1954 |
| 2,891,726 | Decker et al. | June 23, 1959 |
| 2,965,710 | Lee | Dec. 20, 1960 |
| 3,032,745 | Hamer | May 1, 1962 |
| 3,062,913 | Myrick | Nov. 6, 1962 |
| 3,078,344 | Crafts et al. | Feb. 19, 1963 |